(12) United States Patent
Dent et al.

(10) Patent No.: US 12,423,748 B1
(45) Date of Patent: Sep. 23, 2025

(54) PAYMENT PROCESSING METHOD AND APPARATUS WITH ADVANCED FUNDS

(71) Applicant: Stripe, Inc., San Francisco, CA (US)

(72) Inventors: Jack David Paul Dent, San Francisco, CA (US); Jeremy Douglas Hoon, San Francisco, CA (US)

(73) Assignee: Stripe, Inc., San Francisco, CA (US)

( * ) Notice: Subject to any disclaimer, the term of this patent is extended or adjusted under 35 U.S.C. 154(b) by 152 days.

(21) Appl. No.: 18/323,296

(22) Filed: May 24, 2023

Related U.S. Application Data

(63) Continuation of application No. 16/560,011, filed on Sep. 4, 2019, now abandoned.

(51) Int. Cl.
| | | |
|---|---|---|
| *G06Q 40/03* | (2023.01) | |
| *G06N 7/01* | (2023.01) | |
| *G06Q 20/02* | (2012.01) | |
| *G06Q 30/0202* | (2023.01) | |

(52) U.S. Cl.
CPC ............... *G06Q 40/03* (2023.01); *G06N 7/01* (2023.01); *G06Q 20/023* (2013.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 5,615,109 | A * | 3/1997 | Eder | G06Q 10/0631 |
| | | | | 705/7.12 |
| 9,786,005 | B1 * | 10/2017 | Poursartip | G06Q 10/06315 |
| 9,846,848 | B2 * | 12/2017 | Lindores | A01B 79/005 |
| 9,922,326 | B2 * | 3/2018 | Alexander, IV | G06Q 20/4016 |
| 10,453,086 | B1 * | 10/2019 | Scott | G06Q 20/24 |
| 10,565,642 | B1 * | 2/2020 | Cieri | G06Q 10/06315 |
| 10,607,286 | B1 * | 3/2020 | Poursartip | G06Q 20/20 |
| 10,685,342 | B2 * | 6/2020 | Chauhan | G06Q 20/10 |
| 10,692,140 | B1 * | 6/2020 | Kim | G06Q 20/405 |
| 10,755,349 | B1 * | 8/2020 | Boates | G06Q 20/204 |
| 10,796,363 | B1 * | 10/2020 | Kim | G06Q 40/03 |
| 10,872,362 | B1 * | 12/2020 | Shearer | G06Q 20/102 |
| 10,902,512 | B1 * | 1/2021 | Fern | G06Q 20/20 |

(Continued)

FOREIGN PATENT DOCUMENTS

| | | | | |
|---|---|---|---|---|
| WO | WO-2014121002 A1 * | 8/2014 | | G06Q 40/02 |
| WO | WO-2022182680 A1 * | 9/2022 | | G06N 20/00 |

*Primary Examiner* — Matthew S Gart
*Assistant Examiner* — Tony P Kanaan
(74) *Attorney, Agent, or Firm* — Foley & Lardner LLP

(57) ABSTRACT

A payment processing method and apparatus with advanced funds are disclosed. In one embodiment, the method comprises generating, using a revenue forecasting engine of a payment processing system, a probabilistic forecast of revenue for a plurality of merchants for a period of time in the future; determining, using a pricing engine of the payment processing system, one or more potential cash advances for each of the plurality of merchants; automatically generating one or more offers for advances for each of the plurality of merchants; electronically sending a notification containing the one or more offers to the plurality of merchants for display on a graphical user interface (GUI) with information about availability of an advance and terms to enable selection of at least one of the one or more offers.

20 Claims, 14 Drawing Sheets

(56) References Cited

U.S. PATENT DOCUMENTS

| | | | | |
|---|---|---|---|---|
| 11,107,157 B1* | 8/2021 | Kerof | ............... | G06Q 40/03 |
| 11,176,607 B1* | 11/2021 | Bekmann | ............... | G06Q 40/03 |
| 11,250,503 B1* | 2/2022 | Jew | ............... | G06F 3/04847 |
| 11,367,096 B1* | 6/2022 | Scott | ............... | G06Q 20/322 |
| 11,379,913 B1* | 7/2022 | Perelli-Minetti | ...... | G06Q 40/03 |
| 11,410,108 B2* | 8/2022 | Johnson | ............... | G06Q 40/06 |
| 11,481,839 B1* | 10/2022 | Poursartip | ............ | G06F 18/214 |
| 11,494,723 B2* | 11/2022 | Johnson | ............ | G06Q 10/06393 |
| 11,948,140 B1* | 4/2024 | Spitzer | ............... | G06Q 20/3223 |
| 2003/0208439 A1* | 11/2003 | Rast | ............... | G06Q 20/403 |
| | | | | 705/38 |
| 2006/0080194 A1* | 4/2006 | Rachie | ............... | G06Q 40/06 |
| | | | | 705/35 |
| 2007/0282737 A1* | 12/2007 | Brasch | ............... | G06Q 40/08 |
| | | | | 705/38 |
| 2008/0208689 A1* | 8/2008 | Johnson | ............... | G06Q 20/04 |
| | | | | 705/14.27 |
| 2009/0171723 A1* | 7/2009 | Jenkins | ............... | G06Q 10/10 |
| | | | | 705/38 |
| 2012/0157062 A1* | 6/2012 | Kim | ............... | H04M 15/41 |
| | | | | 705/26.1 |
| 2018/0082371 A1* | 3/2018 | Chandler | ............... | G06Q 40/04 |
| 2018/0150910 A1* | 5/2018 | Grech | ............... | G06Q 40/03 |
| 2021/0398104 A1* | 12/2021 | Yan | ............... | G06Q 20/4037 |
| 2023/0114093 A1* | 4/2023 | Dent | ............... | G06N 7/01 |
| | | | | 705/38 |
| 2024/0257124 A1* | 8/2024 | Kolchin | ............... | G06N 20/00 |

* cited by examiner

FIG. 1

| Event | Merchant balance (balance txns) | Cash adv. Balance | Bootstrap acct. | SPC FBO acct. | Sweeps |
|---|---|---|---|---|---|
| (Initial state) | => $0 | => $0 | => $100 | => $0 | => $0 |
| Merchant accepts advance | ($100 transfer), $100 cash advance => $0 | $100 advance, $20 cost => $120 | ($100 ACH transfer) => $0 | => $0 | $0 |
| Merchant makes a $25 charge | $25 charge, ($5 paydown) => $20 | ($4 adv), ($1 cost) => $115 | => $0 | => $0 | $5 |
| Merchant makes a $50 charge | $50 charge, ($10 paydown) => $40 | ($8 adv), ($2 cost) => $105 | => $0 | => $0 | $15 |
| Card network settles charges | => $60 | => $105 | $15 Sweep => $15 | $75 settled ($15 Sweep) => $60 | ($15) |
| Daily ACH to merchant | ($60 transfer) => $0 | => $105 | => $15 | ($60 transfer) => $0 | $0 |

FIG. 4

| Event | Merchant liability | Cash advance receivable* | Cash advance anticipated cost* | V/MC receivable | Pending ACH transfer [0] | Revenue | Anticipated premiums from advances* | Bootstrap account | Stripe FBO |
|---|---|---|---|---|---|---|---|---|---|
| Cash advance payout ($10k) | -10,000 | +10,000 | | | | | | | |
| Anticipated cost of advance ($2k) | | | +2,000 | | | | -2,000 | | |
| Payout ($10k) | +10,000 | | | | -10,000 | | | | |
| ACH for payout | | | | | +10,000 | | | -10,000 | |
| Charge captured ($100) | -100 | | | +100 | | | | | |
| Paydown created ($20) | +16 | -16 | | | | | | | |
| Paydown cost of adv. | | | -4 | | | | +4 | | |
| Paydown rev. Rec. | +4 | | | | | -4 | | | |
| Charge settled ($100) | | | | -100 | | | | | +100 |
| Paydown swept ($20) | | | | | | | | +20 | -20 |

FIG. 5

| Event | Merchant liability | Cash advance receivable* | Cash advance anticipated cost* | V/MC receivable | Pending ACH transfer [0] | Merchant losses | Anticipated premiums from advances* | Bootstrap account | Stripe FBO |
|---|---|---|---|---|---|---|---|---|---|
| Cash advance write off (8k of advance) | | -8,000 | | | | +8,000 | | | |
| Anticipated cost write-off (non-financial) | | | -1,667 | | | | +1,667 | | |

FIG. 6

| Event | Merchant liability | Cash advance receivable* | Cash advance anticipated cost* | V/MC receivable | Pending ACH transfer [0] | Revenue* | Anticipated premiums from advances* | Bootstrap account | Stripe FBO |
|---|---|---|---|---|---|---|---|---|---|
| Cash advance payout ($10k) | -10,000 | +10,000 | | | | | | | |
| Anticipated cost of advance ($2k) | | | +2,000 | | | | -2,000 | | |
| Payout ($10k) | +10,000 | | | | -10,000 | | | | |
| ACH for payout | | | | | +10,000 | | | -10,000 | |
| Charge captured (375*$100) | -37,500 | | | +37,500 | | | | | |
| Paydown created (375*$20) | +6000 | -6000 | | | | | | | |
| Paydown cost of adv. | | | -1500 | | | | +1500 | | |
| Paydown rev. Rec. | +1500 | | | | -1500 | | | | |
| Charge settled ($100) | | | | -37,500 | | | | | +37,500 |
| Paydown swept ($20) | | | | | | | | +7500 | 7500 |

FIG. 7

| Event | Merchant liability | Cash advance receivable* | Cash advance anticipated cost* | V/MC receivable | Pending ACH transfer [0] | Merchant losses | Anticipated premiums from advances* | Bootstrap account | Stripe FBO |
|---|---|---|---|---|---|---|---|---|---|
| Cash advance adjustment payout ($5k) - advance | -4,000 | +4,000 | | | | | | | |
| Cash advance adjustment payout ($5k) - cost | -1,000 | | | | | | +1,000 | | |
| Payout ($5k) | +5,000 | | | | -5,000 | | | | |

FIG. 8

| Event | Merchant liability | Cash advance receivable* | Cash advance cost* | V/MC receivable | Pending ACH transfer | Revenue* | Anticipated premiums from advances* | Bootstrap account | Stripe FBO |
|---|---|---|---|---|---|---|---|---|---|
| Cash advance payout ($10k) | -10,000 | +10,000 | | | | | | | |
| Anticipated cost of advance ($2k) | | | +2,000 | | | | -2,000 | | |
| Payout ($10k) | +10,000 | | | | -10,000 | | | | |
| ACH for payout | | | | | +10,000 | | | -10,000 | |
| ACH for return | | | | | -10,000 | | | +10,000 | |
| Payout return | -10,000 | | | | +10,000 | | | | |
| Cash advance payout return | +10,000 | -10,000 | | | | | | | |
| Anticipated cost of advance | | | -2,000 | | | | +2,000 | | |

FIG. 9

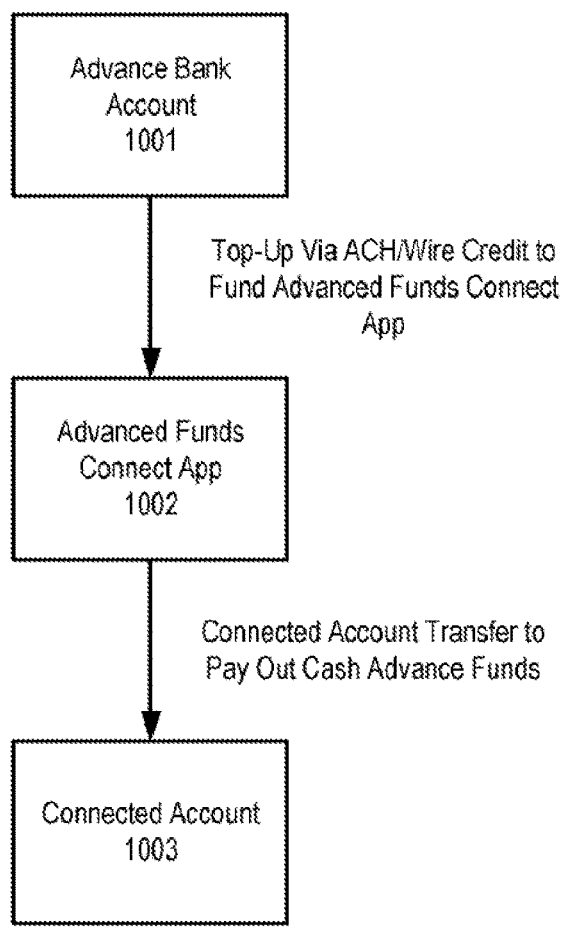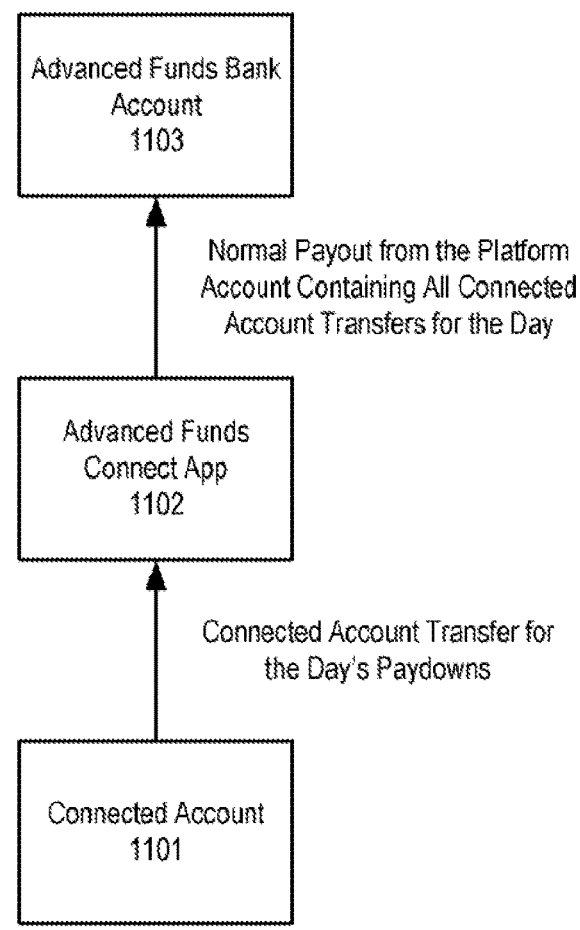
FIG. 10
FIG. 11

PAYMENT PROCESSING METHOD AND APPARATUS WITH ADVANCED FUNDS

CROSS-REFERENCE TO RELATED APPLICATION

The present application is a continuation of U.S. patent application Ser. No. 16/560,011, filed Sep. 4, 2019, entitled "Payment Processing Method And Apparatus With Advanced Funds," and is incorporated by reference in its entirety.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

Embodiments of the present invention relate to the field of systems for processing commercial transactions; more particularly, embodiments of the present invention relate to commercial transactions involving the processing of advanced funds and paydowns of those advanced funds using payment processing fees.

BACKGROUND OF THE INVENTION

Today, many merchants use third parties to handle all their payment processing needs for commercial transactions. In some cases, the merchants redirect their customers to the third party, who is responsible for capturing the payment information and processing the transaction, or the merchants capture payment information themselves from their customers and send it to a third-party payment gateway for real-time authorization of transactions and subsequent settlement of funds.

Cash advances are often provided by credit card issuers or issuers of charge cards. As part of a cash advance, cardholders are allowed to withdraw cash up to a certain limit. For a credit card, the cash advances are limited based on the credit limit of the card or to some percentage of the card's credit limit. There is usually a cost to take a cash advance that is a percentage of the amount that is being advanced. A problem with the typical cash advances made with credit cards is that the interest higher than other credit card transactions and typically compounds daily from the day the cash is borrowed, even if no cash is available to be paid back.

However, while cash advances are available from issuers of credit and charge cards, such advances are not available through third party gateways performing payment acquiring, even when the payment processing involves credit and charge cards.

SUMMARY

A payment processing method and apparatus with advanced funds are disclosed. In one embodiment, the method comprises generating, using a revenue forecasting engine of a payment processing system, a probabilistic forecast of revenue for a plurality of merchants for a period of time in the future; determining, using a pricing engine of the payment processing system, one or more potential cash advances for each of the plurality of merchants; automatically generating one or more offers for advances for each of the plurality of merchants; electronically sending a notification containing the one or more offers to the plurality of merchants for display on a graphical user interface (GUI) with information about availability of an advance and terms to enable selection of at least one of the one or more offers; electronically receiving a response indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down; triggering a transfer of the advance to an account associated the at least one merchant; and determining, by the payment processing system, when the at least one merchant processes charges for payments and creating one or more paydown objects to cause a fraction from each payment as a paydown on the advance while triggering a transfer of other funds associated with each payment to the merchant as part of settlement.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 shows a flow diagram of the steps and entities for implementing embodiments of the present invention.

FIG. 4 is a table depicting a funds flow example of an advance with paydown of the advance through a percentage of charged funds settled to the payment processor.

FIG. 5 is a table illustrating example ledger entries to account for and handle cash advances and the paydown of the advance and the cost of the advance using a fraction from payments.

FIG. 6 is a table illustrating a forgiven advance from an accounting perspective.

FIGS. 7 and 8 are tables illustrating a hypothetical example of a paydown refund flow.

FIG. 9 is a table illustrating an example of an increase in the merchant balance from the failed transfer being compensated by a decrease in merchant liability FIG. 10 is a flow diagram of one embodiment of a process for paying out funds in a Connect-application-based implementation.

FIG. 11 is a flow diagram of one embodiment of a process for performing paydowns in a Connect-application-based implementation.

DETAILED DESCRIPTION

Figure 2A:
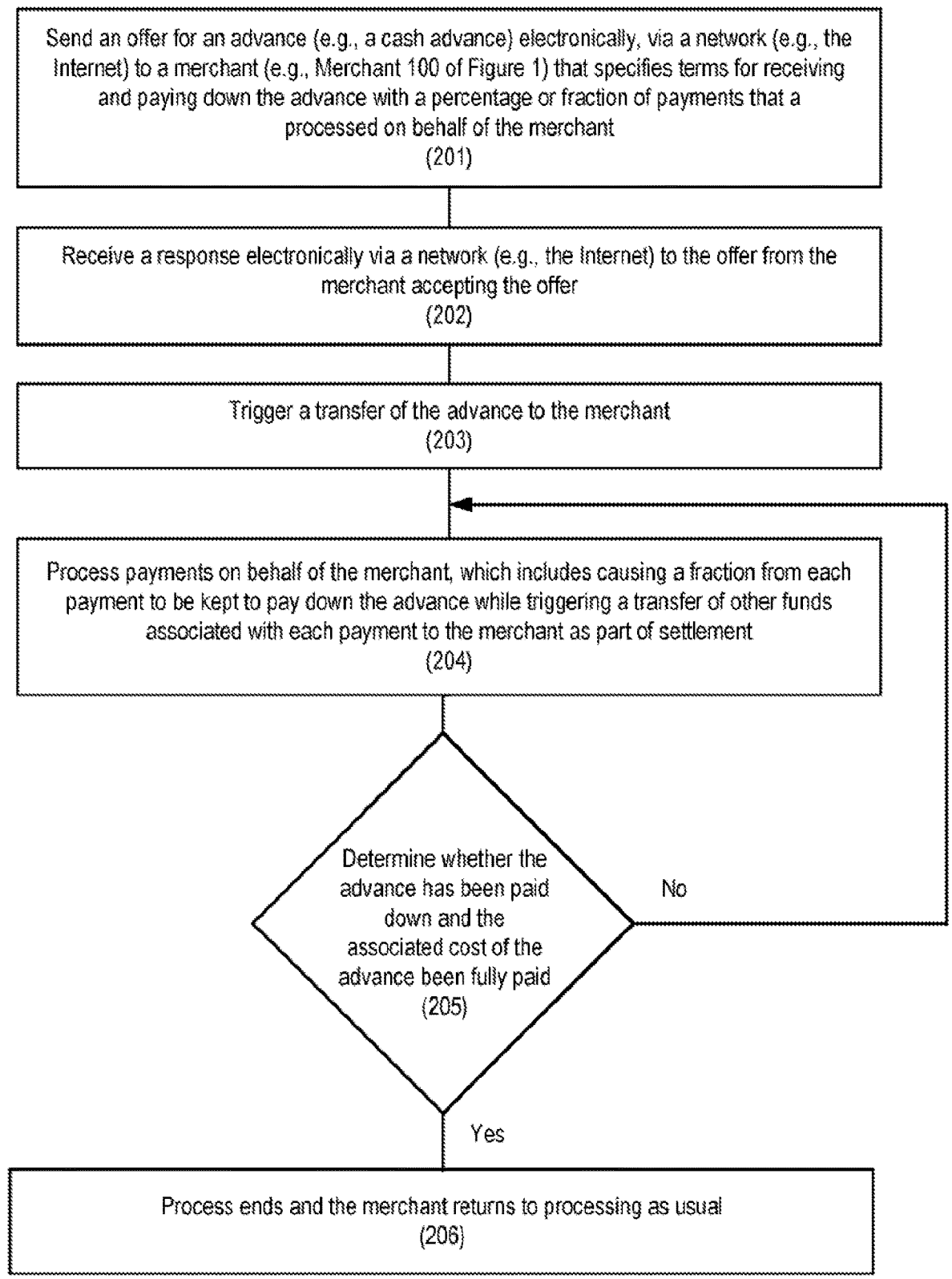
FIG. 2A illustrates one embodiment of a process flow for implementing an advance on future payments.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Certain terminology is used herein for convenience only and is not to be taken as a limitation on the present invention.

Embodiments of the present invention is described in the context of an online payment acceptance service called Stripe® commercialized by Stripe, Inc., San Francisco, California.

The following definitions are provided to promote understanding of the present invention.

Card Network (or Card Association)—refers to financial payment networks such as Visa®, MasterCard®, American Express®, Diners Club®, JCB® and China UnionPay®.

Processor—A processor is a company (often a third party) appointed to handle credit card transactions. They have connections to various card networks and supply authorization and settlement services to merchants or payment service providers. They can also move the money from the issuing bank to the merchant or acquiring bank.

Acquiring Bank—An acquiring bank (or acquirer) is the bank or financial institution that accepts credit and or debit card payments from affiliated card networks for products or services on behalf of a merchant or payment service provider.

Card Issuing Bank—A card issuing bank is a bank that offers card network or association branded payment cards directly to consumers. The issuing bank assumes primary liability for the consumer's capacity to pay off debts they incur with their card.

Payment Information—In one embodiment for making payment via a credit card or debit card, the payment information includes primary account number (PAN) or credit card number, card validation code, expiration month and year. In another embodiment for making payment via an Automated Clearinghouse (ACH) transaction, the payment information includes a bank routing number and an account number within that bank. The payment information includes at least some sensitive, non-public information.

Merchant—A merchant, as used herein, is an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

Merchant Site—The merchant site is the e-commerce site (e.g., website) of the merchant. The merchant (100) and merchant server (120) in the figures are associated with the merchant site. The merchant site is associated with a client-side (client side) application and a server-side (server side) application. In one embodiment, the merchant site includes Merchant Server (120), and the server-side application executes on the Merchant Server (120).

Customer's Electronic Device—This is the device that the customer uses to interact with the merchant. Examples of this device include a desktop computer, a laptop computer, a mobile device (e.g., smartphone, tablet) and game console. The customer's electronic device may interact with the merchant via a browser application that executes on the device, or via a native app installed onto the customer's device. The client-side application executes on the customer's electronic device.

Payment Processor—A payment processor, as referred to herein, is an entity or a plurality of entities that facilitate a transaction between a merchant site and a customer's electronic device. The payment processor includes selected functionality of both Stripe (300) and Processor (400)/Card Networks (500). For example, in one embodiment, Stripe (300) creates tokens and maintains and verifies publishable (non-secret) keys and secret keys in a manner well-known in the art. See for example, U.S. Pat. Nos. 10,134,036, 9,830, 596, and 9,824,354. The Processor (400)/Card Networks (500) is involved in authorizing or validating payment information. In one preferred embodiment, Stripe (300) and the Processor (400)/Card Networks (500) function together to authorize and validate payment information, issue a token, and settle any charges that are made. Accordingly, in one embodiment, the payment processor refers to the functionality of Stripe (300) and the functionality of the Processor (400)/Card Networks (500). In another preferred embodiment wherein step 3A in the high-level description is not performed, and Stripe (300) performs its own verification before issuing a token, the Processor (400)/Card Networks (500) are still used for settling any charges that are made, as described in step 7A in the high-level description. Accordingly, in this embodiment, the payment processor may refer only to the functionality of Stripe (300) with respect to issuing tokens.

Native Application—A Native Application or "native app" is an application commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a locally installed application. A native application differs from an interpreted application, such as a Java applet, which requires interpreter software. A native application also differs from an emulated application that is written for a different platform and converted in real-time to run, and also differs from a Web application that is run within the browser.

Overview

Techniques are disclosed herein for handling transactions involving payment flows in which a cash advance has been provided to a merchant. That is, the techniques disclosed herein enable a payment processing infrastructure to incorporate the processing of advances to merchants and other service providers and their associated paydowns while handling the settlement process. In one embodiment, the cash advances are in the form of flex loans that have minimum payments. In one embodiment, the minimum payments are calculated according to the cash advance amount.

Figure 1:
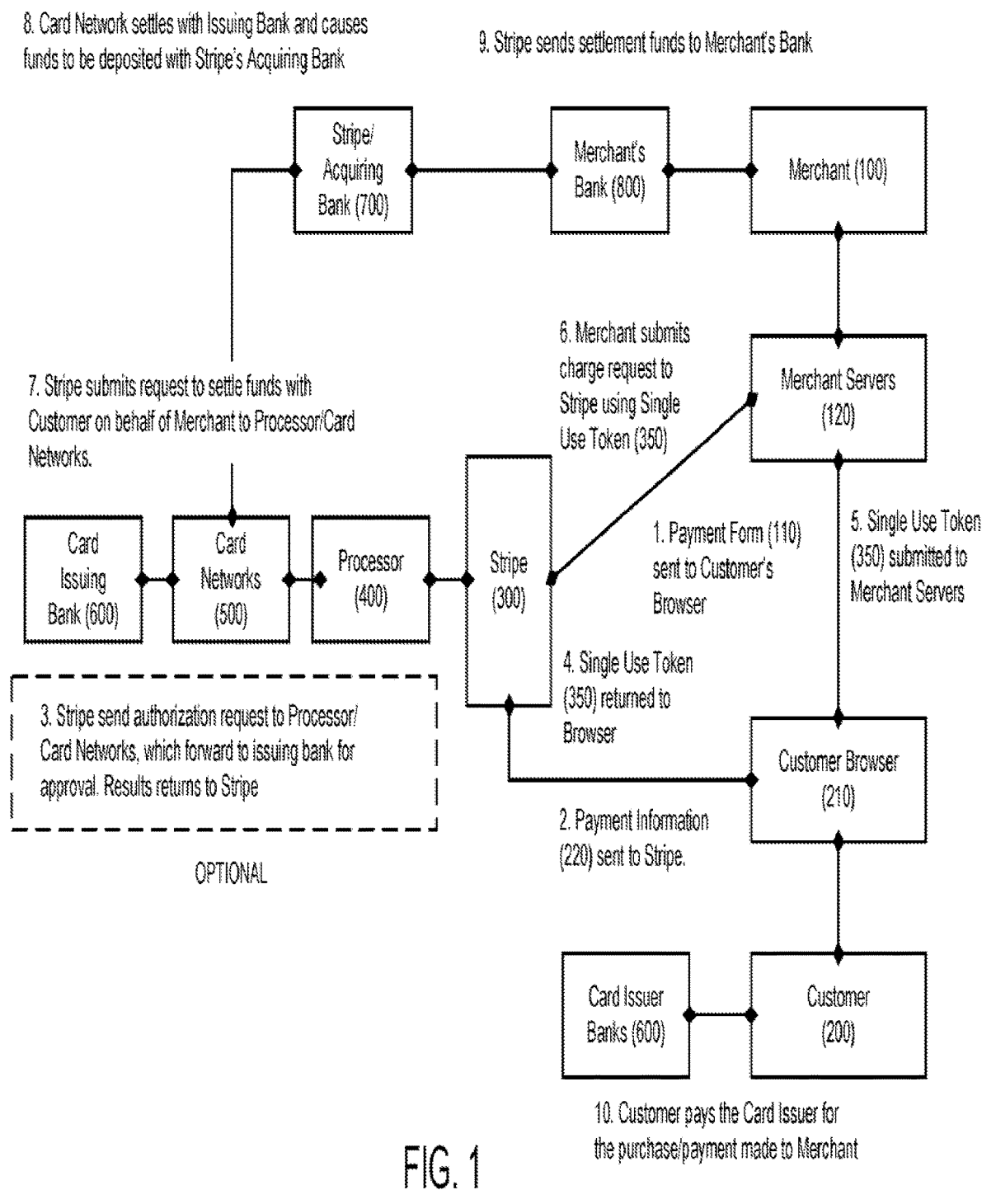

FIG. 1 shows a flow diagram of the steps and entities for implementing payment processing flow embodiments of the present invention.

At a high level, the payment processing framework described herein works as follows (FIG. 1):

1. A Merchant's Customer (200) uses an internet-enabled browser (210) to visit the Merchant's site. In one embodiment, Customer (200) is served a Stripe.js enabled Payment Form (110) using standard web technologies. Stripe.js is well-known in the art. For more information on Stripe.js, see U.S. Pat. Nos. 10,134,036, 9,830,596, and 9,824,354. The Customer (200) enters the necessary information including their Payment Information (220) and submits the Payment Form (110). The Billing Info portion of the Payment Form (110) is for payment via a credit card or debit card. If payment is to be made via an Automated Clearinghouse (ACH) transaction, the Billing Info portion of the Payment Form (110) will request a bank routing number and an account number within that bank, and possibly additional information, such as the bank name and whether the account is a checking or savings account.
2. The Customer's payment information (220) is sent from the Customer's browser (210) to Stripe (300), never touching the Merchant's Servers (120). In this manner, the client-side application electronically sends payment information retrieved from the customer's electronic device to the payment processor. The client-side application does not send the payment information (220) to the server-side application.
3. In one embodiment, Stripe (300) submits the relevant transaction to a Processor (400) or directly to the Card Network (500) for authorization or validation of the payment information. The Card Network (500) sends the request to the Card Issuing Bank (600), which authorizes the transaction. In this embodiment, Stripe (300) and Processor (400)/Card Network (500) function together as a payment processor. In another embodiment, this step is performed without any communication to the Processor (400)/Card Network (500). Instead, Stripe (300) performs its own authorization or validation of the payment information using heuristic means, such as by checking the Bank Identification Number (BIN), also referred to as the Issuer Identification Number (IIN), against a database of known valid BINs that is on file with Stripe (300). (The BIN is a part of the bank card number, namely the first six digits.) In yet another embodiment, this step is not performed at all since the authorization or validation is not necessary for the next step 4 to succeed. That is, it is acceptable to create a Single-use Token in step 4A that represents payment information which has not been validated in any way.
4. If authorized, Stripe (300) will generate and return a secure, Single-use Token (350) to the Customer's Browser (210) that represents the customer's payment information (220) but doesn't leak any sensitive information. In the embodiment wherein step A3 is not performed, Stripe (300) performs this step without waiting to receive authorization from the Processor (400) or the Card Network (500). In this manner, the payment processor (here, Stripe (300)) creates the Token (350) from the payment information sent by the client-side application, wherein the Token (350) functions as a proxy for the payment information (220).
5. The Payment Form (110) is submitted to Merchant's Servers (120), including the Single-use Token (350). More specifically, the payment processor sends the Token (350) to the client-side application, which, in turn, sends the Token (350) to the server-side application for use by the server-side application in conducting the transaction.
6. The Merchant (100) uses the Single-use Token (350) to submit a charge request to Stripe (or to create a Customer object for later use). In this step, Stripe (300) submits a request to authorize the charge to the Processor (400) or directly to the Card Network (500). This authorization specifies the actual amount to charge the credit card. If an authorization was already done in step 3A for the correct amount, this authorization request can be skipped. This may be a one-time payment for a merchant item, or it may involve registering the payment information with the merchant site for subsequent use in making a payment for a merchant item (so-called "card on file" scenario). Using the process described in steps 1-6, the payment information can be used by the server-side application via the Token (350) without the server-side application being exposed to the payment information.
7. Stripe (300) settles the charge on behalf of the Merchant (100) with the Processor (400) or directly with the Card Network (500).
8. The Card Network (500) causes the funds to be paid by the Card Issuing Bank (600) to Stripe (300) or to Stripe's Acquiring Bank (700).
9. Stripe (300) causes the settled funds to be sent to the Service Provider (100) (or to the Merchant's Bank (800)), net of any applicable fees.
10A. The Card Issuing Bank (600) collects the paid funds from the Customer (200).

Advance Infrastructure Overview

In one embodiment, the platform described above is augmented to allow customers (e.g., merchants, service providers, etc.) of a payment processor (e.g., Stripe) to receive an advance on their future payments, and then pay down this advance and its cost from a portion of each of their payments. Note that in another embodiment, the paydowns of the advance and its costs are done only using a subset (e.g., less than all) of the payments being processed for the customer.

FIG. 2A illustrates one embodiment of a process flow for implementing an advance on future payments. In one embodiment, the processes are performed by processing logic that may comprise hardware (circuitry, dedicated logic, etc.), software (e.g., software running on a chip), firmware, or a combination of the three. In one embodiment, the process is performed by a payment processing system of a payment processor. An example of a payment processing system is described in more detail below. In the following example, the payment processor customer is a merchant. However, the techniques disclosed herein are not limited to use with a merchant, and may be any provider of a service or product.

Referring to FIG. 2A, the process begins by processing logic sending an offer for an advance (e.g., a cash advance) electronically, via a network (e.g., the Internet), to a merchant (e.g., Merchant 100 of FIG. 1) that specifies the advance amount and terms for receiving and paying down the advance with a percentage or fraction of payments that are processed on behalf of the merchant by the payment processor (processing block 201). For example, the terms might specify that the cost of the advance is a number from 10-20% of the advance amount and that the withhold rate of the payments that are processed daily by the payment processing system is a percentage from 1-20%. These are only examples of numbers and others may be used. In one embodiment, this offer is sent by the payment processing system and its processing logic (e.g., Stripe 300 and Processor 400 of FIG. 1).

Subsequently, processing logic receives a response electronically, via a network (e.g., the Internet), to the offer from the merchant accepting the offer (processing block 202). In response to the acceptance, processing logic triggers a transfer of the advance to the merchant (processing block 203). This may be performed by the payment processor (e.g., Stripe 300 and Processor 400) sending a request for a bank transfer from its bank to the merchant's bank (e.g., Merchant's bank 800).

Thereafter, processing logic processes payments on behalf of the merchant, which includes causing a fraction from each payment to be kept to pay down the advance and the cost of the advance while triggering a transfer of other funds associated with each payment to the merchant as part of settlement (processing block 204).

Processing logic determines whether the advance has been paid down and whether the associated cost of the advance has been fully paid (processing block 205). If not, the process transitions to processing block 204 and the process continues until the advance has been paid down and the associated cost of the advance has been fully paid. If the advance has been paid down completely and the associated cost of the advance been fully paid, the process transitions to processing block 206 where the process ends and the merchant returns to processing as usual.

Figure 2B:
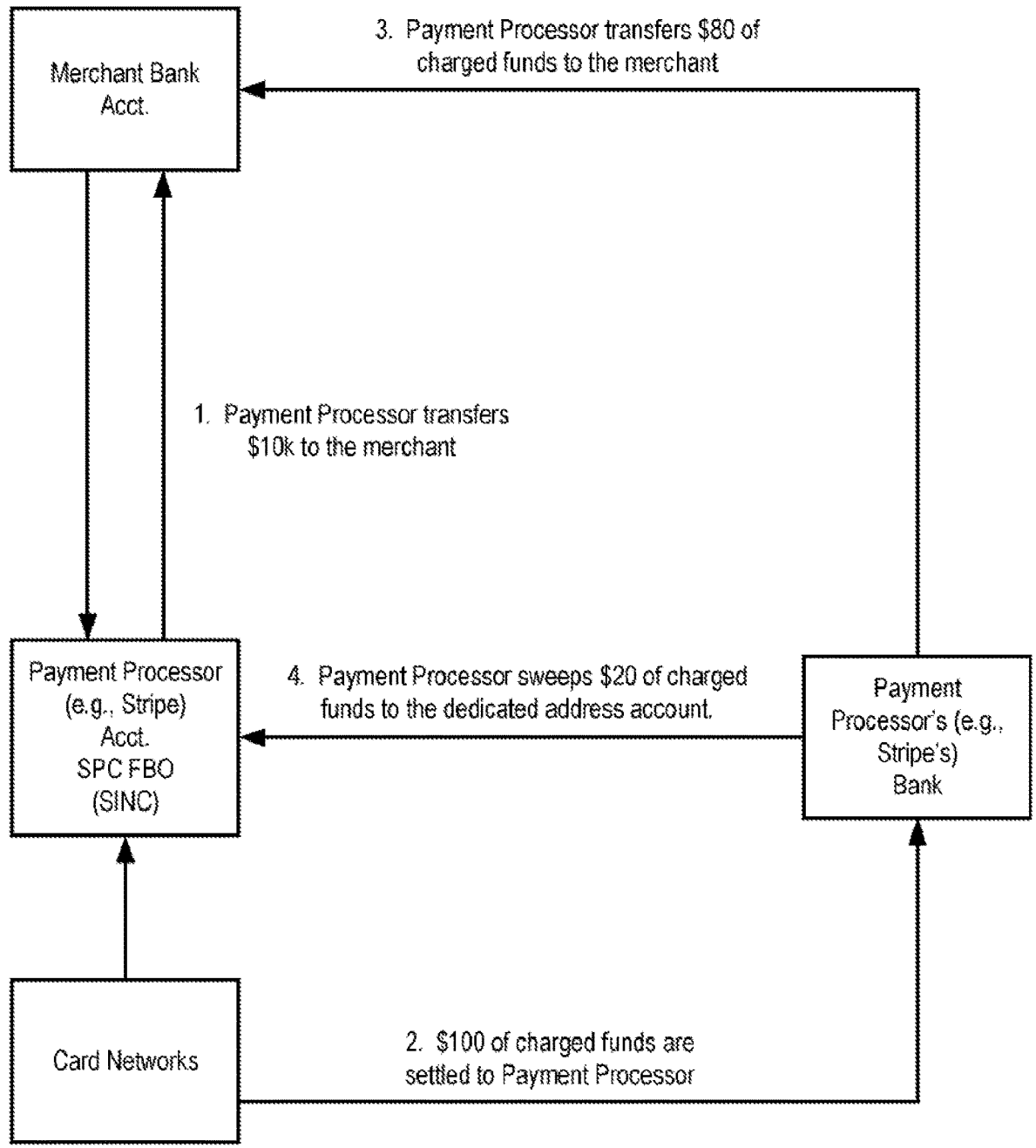
FIG. 2B illustrates an example of a process for handling the advances described herein in conjunction with a payment processing flow.

FIG. 2B illustrates an example of a process for handling the advances described herein in conjunction with a payment processing flow. In this case, payment processor offers a merchant $10K using an electronic communication (e.g., a network request). The electronic communication included a notification or alert detailing the advance amount and terms depicting the cost of the advance (e.g., 20%) and the terms for paying down the advance (e.g., a fraction or percentage of 20% that is to be taken from each payment processed for paying down the advance and its cost). After receiving the offer notification for $10K, the merchant accepts the offer. This may be done by using a graphical user interface (GUI) element (e.g., a button, link, etc.) that causes an electronic communication (e.g., a network response) to be sent accepting the offer, which is received by the payment processor.

Referring to FIG. 2B, after the offer of the advance has been accepted, the payment processor (e.g., Stripe) transfers the advance amount (e.g., $10K) to the merchant. Subsequently, the $100 of charge funds is settled to the payment processor on behalf of the merchant. The payment processor transfers $80 of the charged funds to the merchant and sweeps $20 (e.g., the 20% paydown fraction) of the charged funds to an advance account of the payment processor. In one embodiment, the advance account is SPC FBO (SINC).

Figure 3:
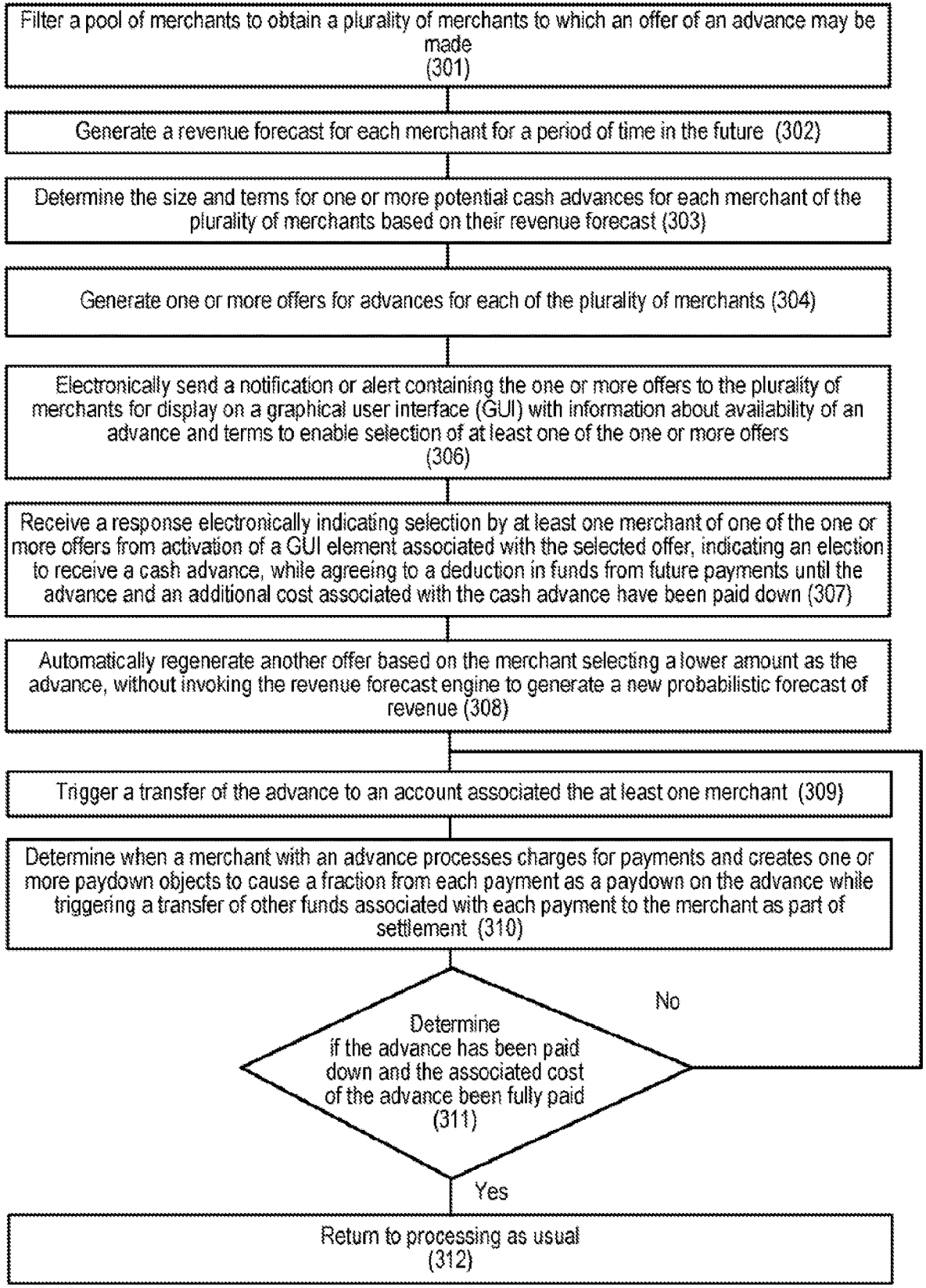
FIG. 3 is a more detailed flow diagram of one embodiment of a process for performing an advance that is paid down when processing transactions with a payment processing system.

FIG. 3 is a more detailed flow diagram of one embodiment of a process for performing an advance that is paid down when processing transactions with a payment processing system. In one embodiment, the processes are performed by processing logic that may comprise hardware (circuitry, dedicated logic, etc.), software (e.g., software running on a chip), firmware, or a combination of the three. In one embodiment, the process is performed by a payment processing system of a payment processor. An example of a payment processing system is described in more detail below.

Referring to FIG. 3, the process begins by filtering a pool of merchants to obtain a plurality of merchants to which an offer of an advance may be made (processing block 301). In one embodiment, the pool of merchants comprises all the merchants for which the payment processor system is handling payment processing. The filtering may be used to select only merchants that have one or more of a predetermined level of revenue (e.g., $10,000), a diversity of product categories, an increase in sales over time (e.g., revenue growth for the $3^{rd}$ month being at least 1.05 times the size of the first month), a predetermined amount of time associated with the payment processing system (e.g., at least 4 weeks, etc.), predetermined locations (e.g., only merchants in the US receive advances, etc.), etc. In one embodiment, this operation is not performed and all merchants are evaluated using the operations below.

In one embodiment, the payment processing system automatically sends a notification to the merchant to notify the merchant when they become eligible for a cash advance. The notification may take many forms including, but not limited to, an email notification, a text message notification, etc.

For the plurality of merchants that remain after filtering, processing logic generates a revenue forecast for each merchant for a period of time in the future (processing block 302). In one embodiment, the revenue forecast is a probabilistic revenue forecast generated with a revenue forecasting engine. In one embodiment, the revenue forecasting engine generates a plurality of time series revenue forecasts in parallel for the plurality of merchants. In one embodiment, this parallelism is accomplished using a distributed general-purpose cluster-computing framework (e.g., Apache Spark, etc.) that is able to receive and schedule the execution of revenue forecasting function in parallel on one or more clusters (e.g., parallel virtual machines). In this manner, the system is able to generate hundreds or even thousands of revenue forecasts for each merchant at the same time, thereby greatly reducing the amount of time necessary to perform the revenue forecasting. In one embodiment, the time series models used to generate the revenue forecasts for the merchants are trained in parallel.

In one embodiment, the period of time for the revenue forecast is predetermined. The period of time may be one year, eighteen months, two years, or any period of time into the future. In one embodiment, this period of time is programmable within the payment processing system.

Once a revenue forecast has been generated for each merchant, processing logic determines the size and terms for one or more potential cash advances for each merchant of the plurality of merchants based on their revenue forecast (processing block 303). In one embodiment, this determination is made using a pricing engine of the payment processing system. In one embodiment, one output of the pricing engine is a maximum advance amount for each merchant of the plurality of merchants and is generated as a result of determining the size and terms for one or more potential cash advances. In one embodiment, the pricing engine performs a search over every possible cash advance with terms deemed acceptable for that individual merchant. In one embodiment, the search is a grid search. Other types of searches or ways to generate offers may be used. An example of one such alternative is described in more detail below. In one embodiment, the pricing engine calculates a probabilistic rate of return associated with the probabilistic forecast of revenue assuming the terms. In other words, the pricing engine determines a rate of return that would be associated with one or more advance amounts in view of the probabilistic revenue forecast. In one embodiment, rates of return in the order of 20-30% are acceptable to the payment processing system for advance funds offers that are to be made.

After determining the size of one or more advances and their associated rates of return, processing logic automatically generates one or more offers for advances for each of the plurality of merchants (processing block 304).

In one embodiment, the multiple offers include the offer for each eligible merchant with the maximum advance amount. In one embodiment, if multiple offers exist for the maximum advance amount, the system selects the offer for which the IRR is closest to a predetermined target number (e.g., 20%, 25%, 30%, etc.).

Alternative Technique for Generating Offers

In one embodiment, given any desired IRR rate and a fixed volume forecast, the premium rate to obtain that IRR only varies with the duration of the advance (the number of weeks a merchant needs to pay off the cash advance). In one embodiment, the relationship between duration and premium rate is independent of the advance amount and withhold rate. In one embodiment, the system leverages this relationship to generate offers analytically, without relying on a grid search as discussed above. In the following example, the terms are defined as follows:
1) Advance amount: $a \in [a_{min}=2k, a_{max}=25k]$
2) Premium rate: $p \in [0, p_{max}]$
3) Total amount sold: $a \cdot (1+p)$
4) Withhold rate: $w \in [w_{min}=0.4\%, w_{max}=20\%]$
5) Forecast length: N=78 weeks
6) Forecasts: $V_1, \ldots, V_N$
7) Repayment duration: $n \in [n_{min}=16$ weeks, $n_{max}$ 42 weeks]
8) Target IRR: r=25%

In one embodiment, the system generates offers using the following operations that are performed in response to processing logic (e.g., one or more processors or controllers) of the system executing one or more commands:
1. For a given set of forecasts, calculate the premium rate for $n \in [n_{min}, n_{max}]$ according to the following formula:

$$p_n = \left(\sum_{i=1}^{n} V_i\right) \Bigg/ \left(\sum_{i=1}^{n} \frac{V_i}{(1+r)^i}\right) - 1$$

In one embodiment, the premium rate is independent of the advance amount and the withhold rate for a fixed IRR and repayment duration.

2. Find the value n* that maximizes the premium rate p* subject to the condition $p_n^* \leq p_{max}$.

If there are no such values of n, then the system does not generate an offer for this merchant.

3. Calculate the advance amount a* according to the following formula:

$$a^* = \frac{w_{max}}{1+p^*} \cdot \sum_{i=1}^{n} V_i$$

If $a^* \leq a_{min}$, then the system does not generate an offer for the merchant. If $a^* > a_{max}$, then set:

$a^* = a_{max}$ $a^* = a_{max}$ $w^* = \frac{a_{max} w_{max}}{a^*}$

If $w^* \leq w_{min} = 0.4\%$, then the system does not generate an offer for the merchant.

The process of generating offers set forth above has a number of advantages. These include not having to run an (expensive) IRR grid search to find offers, and only having to run a maximum of N calculations for net present value (NPV). This saves money and reduces our development iteration time. Also, using this process allows the system to use continuous values for amounts like the withhold rate by default, so no offers will be missed by use of the grid search. Furthermore, in one embodiment, by using this process, offers are fixed by setting their IRR rather than fixing the premium rate, which may be a better way to price.

Notification and Acceptance

Referring back to FIG. 3, next processing logic electronically sends a notification or alert containing the one or more offers to each of the plurality of merchants for display on a graphical user interface (GUI), where each of the offers includes information about the availability of an advance and its terms and enables selection of such an offer (processing block 306). In one embodiment, the notification comprises an electronic mail, text (e.g., SMS) or another message transferred over a network (e.g., the Internet). In one embodiment, the GUI is a merchant dashboard used by the merchant to track payment processing performed by the payment processing system.

In one embodiment, the notification indicates the availability of multiple, different cash advance amounts that may be selected by the merchant, along with the GUI element (e.g., a button, link, slider, drop down menu, other selectable indicia, etc.) to select each if the merchant so desires. In one embodiment, multiple cash advance offers are provided to merchants. Each of the offers has different terms. In one embodiment, these multiple offers are shown in a user interface (e.g., a dashboard). In one embodiment, for every cash advance that is extended, accurate estimates of the internal rate of return (IRR) are generated, the number of days it will take to repay the advance from the generated forecasts are determined. In one embodiment, the cash advance offers that are produced have reasonable advance amounts, i.e. no offers for oddly-specific amounts like $6,307.

In one embodiment, the system is able to automatically regenerate another offer based on the merchant selecting a lower amount as the advance with the same rate of return, without invoking the revenue forecast engine to generate a new probabilistic forecast of revenue or invoking the pricing engine (processing block 308). In one embodiment, the terms of the smaller cash advances, along with accurate estimates of the internal rate of return (IRR) and the number of days it will take to repay the advance, are derived from the offer with the maximum advance amount. In one embodiment, this is performed by the merchant's client that is used to view the offer, instead of having to return to the payment processing system to generate these numbers. Given an offer with advance amount a, withhold rate w, premium rate p, it is possible to derive a new offer that has the same IRR and repayment schedule by dividing both the advance amount and the withhold rate by a common scalar factor k. In one embodiment, one or more commands executed by the system allow a merchant to accept the offer for any amount that is: divisible by a first predetermined number (e.g., $500 in one example); above a second predetermined number representing a minimum cash advance (e.g., $1,000 in the one example); and below third predetermined number representing a maximum cash advance (e.g., $25,000 in the one example). In one embodiment, the one or more commands create a new cash advance, prorating the advance amount and withhold rate accordingly. For example, if the merchant is eligible for up to $20,000 at a withhold rate of 7.5% and they accept $15,000, the system prorates the withhold rate to $15,000/$20,000*7.5%=5.625%. In one embodiment, the withhold rate is rounded to one decimal place, i.e. in this case it would be 5.6%.

In one embodiment, the system generates and displays on a merchant dashboard three offers, where the first is for the full advance amount, the second is for 75% of the maximum advance amount, rounded up to the nearest $500 with the withhold rate prorated accordingly; and the third is for 50% of the maximum advance amount, rounded up to the nearest $500 with the withhold rate prorated accordingly. For example, if the maximum advance amount is $7,500 with a withhold rate of 12.5% and a premium rate of 10%, the system generates and enables display on the merchant dashboard the following offers: 1) $7,500 at a 12.5% withhold rate, with a premium of $750; 2) $5,500 at a 9.2% withhold rate, with a premium of $550; and 3) $4,000 at a 6.7% withhold rate, with a premium of $400.

In another embodiment, the merchant's user interface includes a slider, or trackbar (e.g., a GUI element with which a user may set a value by moving an indicator) that a user may move between a minimum cash advance amount to a maximum cash advance amount, thereby enabling the user to select the specific cash advance amount that is desired (between the two endpoints). Alternatively, the user could click on a point on the slider to select the cash advance amount that is desired. In one embodiment, based on the advance amount selected by the user with the slider, the system rounds up the advance amount to the nearest predetermined dollar amount (e.g., $500) and prorates the withhold rate accordingly.

In response to the offer notification, processing logic subsequently receives a response electronically indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down (processing block 307). In one embodiment, this election is performed by selecting a graphical user interface (GUI) element (e.g., button, link, reply, etc.) in a dashboard used by the merchant to track the merchant's payment processing that is being performed by the payment processor. Thus, the response indicates that the merchant has elected to receive the cash advance, agreeing to let the payment processor deduct funds from their future payments until the advance and an additional cost associated with the cash advance have been paid down.

In one embodiment, the payment processing system receives a response (e.g., message, etc.) indicating that the merchant is not interested in receiving an advance at this time but would like to receive a reminder in the future regarding the advance to determine whether to take the advance at that time.

In one embodiment, offers are time limited and may expired after a predetermined period of time (e.g., one week, one month, thirty days, etc.). In one embodiment, new offers are automatically regenerated. In one embodiment, this occurs if the offers have expired and the merchant still meets the criteria for receiving an offer of an advance. In another embodiment, new offers are generated in response to a merchant's revenue exceeding their revenue forecast by a predetermined amount that would warrant a higher advance amount.

Optionally, in one embodiment, even after an offer has been accepted by a merchant, the payment processing system performs a final review to determine if an advance will be given to the merchant. In other words, the payment processing system revokes an advance after the advance offer has been accepted by the merchant but hasn't been paid. The payment processing system may decline to give an advance at this stage for one or more of a number of reasons. For example, by the time the offer was accepted by the merchant, the merchant may have been identified as a service violator. Also, it's possible that the revenue of the merchant has dropped substantially between the time of the offer and its acceptance, and the advance is revoked due to the revenue drop. In one embodiment, this review might be performed by one or more individuals working with the payment processing system.

Assuming the payment processing system is continuing with an advance and in response to receiving a response indicating an advance offer has been accepted, processing logic triggers a transfer of the advance to an account associated with the at least one merchant (processing block 309). In one embodiment, the transfer occurs from an account of the payment processor to the merchant's bank account. In one embodiment, the triggering of the transfer of the advance to the account of the merchant is performed via Automated Clearing House (ACH) in response to generating and sending a request electronically to the payment processor's back (e.g., Stripe/Acquiring bank 700). In one embodiment, simultaneously with the transfer, the payment processor creates a balance transaction for the amount of transfer. This has the effect of ensuring that cash advances do not have a net effect on the merchant's balance.

Processing logic then determines when a merchant with an advance processes charges for payments and creates one or more paydown objects to cause a fraction from each payment as a paydown on the advance while triggering a transfer of other funds associated with each payment to the merchant as part of settlement (processing block 310). In one embodiment, the paydown object is generated with a balance transaction for the merchant to track settlement of their funds. In one embodiment, this occurs every time in response to the merchant processing a charge and invokes use of the payment processor. As a result of the accompanying balance transaction, the merchant funds are settled by the payment processor.

In one embodiment, the creation of the paydown object causes the processing logic to create a sweep instruction to perform a sweep to transfer the fraction representing the paydown amount, out of the card network settlement account, and into an advance account. In one embodiment, this advance account is the account used to provide the cash advance to the merchant. Thus, the processing logic determines when a merchant processes a charge and where every time a payment is made to the merchant, the processing logic marks an agreed-upon fraction from the payment as a "paydown" on the advance and provides the rest to the merchant. For example, in one embodiment, the processing logic transfers a first fraction (e.g., 20%) of the processed charge as a paydown on the advance, while transferring a second fraction of those funds (e.g., 80%) to the merchant. Note that percentages other than 20%/80% may be used. In one embodiment, paydowns are generated asynchronously outside of the charge flow used to process charges made by and settled with the merchant.

In one embodiment, once a paydown has been created, it is never returned to the merchant. Therefore, in one embodiment, if a charge is refunded after capture or charged back, the paydown remains.

In one embodiment, the paydown sweeps may be batched and executed in single book transfer to transfer the cumulative paydown for all the sweeps. This single book transfer may be scheduled to occur at predetermined intervals (e.g., hourly, daily, weekly, monthly, etc.) and those would batch all of the paydown sweeps for the period of time associated with the interval into one cumulative amount. In one embodiment, only funds that correspond to paydowns are bundled into a transfer. For example, in one embodiment, adjustments, returned funds for disputes won, fees paid, and other activity on the merchant's account are not factored into the paydown sweeps. In one embodiment, sweeps are dated by the estimated arrival time of funds from card networks, not by the date of the paydown.

Subsequently, processing logic determines whether the advance has been paid down and the associated cost of the advance has been fully paid (processing block 311), thereby determining that a merchant has satisfied an obligation to paydown the advance amount. If not, the process continues until the advance has been paid down and the associated cost of the advance has been fully paid. In one embodiment, determining when the at least one merchant has satisfied an obligation to paydown the advance amount includes tracking one or more balances remaining to be paid down associated with each advance (e.g., cash advance balance and the cost balance associated with the advance, a combined advance and advance cost balance, etc.) and using the balance(s) associated with the advance account for the at least one merchant to determine whether the at least one merchant has satisfied the obligation to paydown the advance.

If processing logic determines whether the advance has been paid down and the associated cost of the advance has been fully paid, the process ends and the merchant returns to processing as usual (processing block 312).

Note in the case of a cash advance as part of a flex loan, if the amounts paid down do not equal the minimum payments, processing logic in the system may perform operations to obtain an amount of money equal to the difference between the amount owed as a minimum payment and the amount actually paid down. In one embodiment, the processing logic of the payment processor payment processor performs a transfer, via ACH, from the merchant's bank account to transfer the amount necessary to cover the difference.

FIG. 4 is a table depicting a funds flow example of an advance with paydown of the advance through a percentage of charged funds settled to the payment processor. Referring to FIG. 4, the merchant accepts an advance of $100. In response to this, the payment processor creates a cash advance balance of $120 that includes the amount of the cash advance ($100) plus the cost of the cash advance ($20) and causes a transfer of the $100 cash advance to the merchant.

Thereafter, the payment processor handles two charges (e.g., $25, $50) made by the merchant. In each case, a portion of each charge (e.g., $5, $10) is taken as a paydown to reduce the cash advance balance. The card network settles the two charges, and after a sweep is made into the dedicated account for the two paydown amounts (totaling $15), the remaining amount ($60) is in the merchant's account. The payment processor performs a daily transfer, via ACH, to the merchant to transfer the remaining amount (e.g., $60) to the merchant.

The process depicted in the funds flow example of FIG. 4 continues until the cash advance balance falls back to 0, leaving $120 in the dedicated advance account.

As set forth in the example in FIG. 4, in one embodiment, the amount a merchant agrees to pay down is the sum of two numbers: the amount of the advance they received and the premium for that advance. In one embodiment, the premium is roughly 10-20% of the advance (though this may be adjusted in either direction).

In one embodiment, tracking is performed on the amount advanced itself and its premium separately. This is because the two are treated differently in one type of accounting. Note that in an embodiment in which accounting does not treat these two differently, the tracking can be performed together.

In one embodiment, the payment processor keeps the merchants apprised of the state of their advance(s). In one embodiment, the payment processor keeps merchants apprised of the state of their advances by periodically (e.g., daily) sending messages (e.g., emails, text, dashboard) or other notifications to merchants that have an outstanding cash advance.

In one embodiment, the payment processing system performs functionality described above using an internal interface. In one embodiment, the internal interface performs functionality to fund the cash advance, receive paydowns with respect to the cash advance and its cost, and manage the accounts for the cash advance and the paydown as described above.

An Exemplary Data Model

Figure 14:
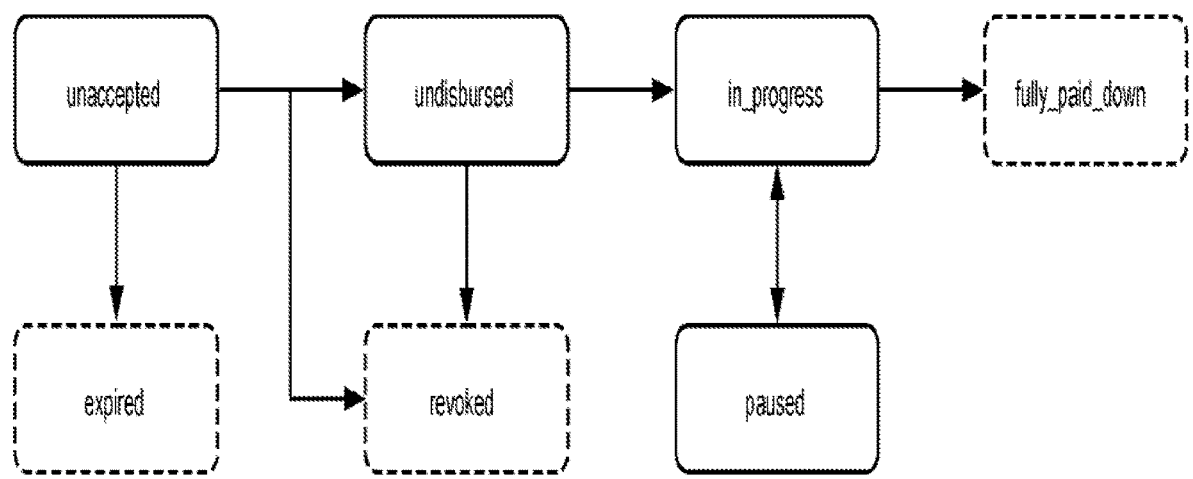
FIG. 14 is a state diagram of one embodiment of the cash advance process.

To implement the advance features described above, a data model is used. One embodiment of the data model includes the following:

CashAdvance—In one embodiment, CashAdvance is a state machine, for which per-state data is stored. FIG. 14 is a state diagram of one embodiment of the cash advance process. Referring to FIG. 14, the states of the cash advance state diagram are unaccepted, undisbursed, in_progress, fully_paid_down, expired, revoked and paused states are marked with dotted borders. In one embodiment, if the cash advance is either undisbursed, in_progress, paused, or fully_paid_down, the system regards it as accepted. From the unaccepted state, the state machine can transition to the expired state after the case advance offer has expired without acceptance by the merchant, the undisbursed state where the offer of a cash advance has been accepted but the advance funds haven't been provided to the merchant, or the revoked state in which the case advance offer is revoked prior acceptance by the merchant. From the undisbursed state, the state machine transitions to the in_progress state after the case advance has been disbursed to the merchant and remains in the state until the advance is paid down fully. While in the in_progress state, the state machine may transition to the paused state and back if paying down the advance is paused for some reason. When the advance has been fully paid down, the state machine transitions to the fully_paid_down state. From the undisbursed state, the state machine can transition to the revoked state if the advance has been revoked after the merchant accepts the advance. In one embodiment, this is stored as a field on the CashAdvance. In another embodiment, this is stored in separate objects. For example, for the "agreement pending" state, an "agreement" record is stored that points at the CashAdvance.

CashAdvanceBalance—This is the data storing the current cash advance balance. In one embodiment, it is instantiated by querying Merchant Balances infrastructure.

CashAdvancePayout—This data links a transfer of the cash advance to a payout.

CashAdvancePayoutReversal—This data links a CashAdvancePayout to a transfer in case the merchant requests that their advance is reversed.

CashAdvancePaydown—This is an immutable record linked to a payment that indicates the cash advance paydown amount for each payment processed by the payment processing system.

CashAdvancePaydownReversal—This data links to a CashAdvancePaydown in case return the funds associated with the paydown to the merchant.

In one embodiment, the data model includes data for internal use only within the payment processing system (as opposed to data provided and available the merchants that are getting and paying down cash advances) and includes:

OnBalanceSheetCashAdvance (implements the internal interface) —this provides funding for a user-facing CashAdvance and receives the paydowns it produces. In one embodiment, this accounts for the fund flows out. In one embodiment, this is used by crediting receivables and recognizing revenues from paydowns.

CashAdvancePaydownSweep—this is a record used to sweep funds out of the payment processor FBO account into the dedicated advance account. In one embodiment, this is linked to a WireBookTransfer or another internal-money-movement record. In one embodiment, this is generated by aggregating multiple CashAdvancePaydowns within a fixed period.

Example of Cash Advance Accounting Implementation

The following explains the ledger entries generated to properly account for the impact of providing advances on merchant balances, payment processor cash, and the outstanding balance of cash advances themselves.

FIG. 5 is a table illustrating example ledger entries to account for and handle cash advances and the paydown of the advance and the cost of the advance using a fraction from payments. Referring to FIG. 5, in this example, a merchant accepts a cash advance of $10,000, with a cost of $2,000, for a total liability to the payment processor of $12,000. For each charge made by the merchant, the payment processor withholds 20% of the charge to pay down the cash advance. The cash accounts are in bold, the merchant-specific balances are in italics, the payment processor-internal balances are underlined, and the new accounts that are needed to add to the ledger account schema are denoted with an asterisk. Note that "V/MC" represents Visa and Mastercard in the table.

In one embodiment, there are several additional accounting operations that occur between this account and cash, and these are cash advance forgiveness flow, paydown refund flow, and failed payout flow.

In one embodiment, if an advance is to be forgiven and written off, a merchant does not have to continue paying down an advance and there is a cash advance forgiveness flow. FIG. 6 is a table illustrating this from an accounting perspective. In other words, the payment processing system accounts for the forgiveness/write-off as a loss.

In one embodiment, the advance infrastructure includes a process for performing a paydown refund flow. FIG. 7 is a table illustrating a hypothetical example of a paydown refund flow in which a merchant takes out a cash advance and one month later, the merchant runs a large flash sale, generating a 10× spike in daily volume of transactions. In this situation, the merchant asks for some of the paid down funds to be returned to them, since they generated such a high rate of return.

In the example, a merchant takes a $10,000 advance at a $2,000 cost, but pays down the first ¾ of it back in the first ¼ of the expected paydown period. At this point, the merchant has paid down 75% of the cash advance. The cash advance balance stands at $2,500, and the balance of the cash advance cost stands at $500. The merchant has returned funds three times faster than expected. In one embodiment, the payment processor is able to offer some flexibility to the merchant to take into account for the unexpectedly strong performance, the payment processor could return ⅔ of the advance paid down ($4,000), ⅔ of the cost paid down ($1000), adjust the merchant's withhold rate, and continue on in line with the plan. Note that in another embodiment, the payment processor performs one or more of these operations.

FIG. 8 is a table continuing this example. As shown, adjusting the merchant's withhold rate amounts to giving the merchant the middle half of the paydown period free of cost. One observation, however, is that the payment processor takes a loss on the cost funds that are transferred back to the merchant.

In one embodiment, the advance infrastructure includes a process for a failed payout flow. When the payment processor pays out funds from the advance account to a merchant, it is possible that this payout fails. This may occur for a number of reasons. An example of such a reason is that the merchant's back account was suddenly closed. As a result, the payment processor credits the amount of the transfer to the merchant as part of their available balance. This excess balance would normally be handled by increasing the size of the merchant's next automatic payout.

In one embodiment, the accounting infrastructure of the payment processing system attempts to keep the merchant's automatic payout from growing any larger. This would essentially mean that the payment processing system would be transferring advance funds through the SPC FBO. Instead, in one embodiment, the increase in the merchant balance from the failed transfer is compensated by a decrease in merchant liability. FIG. 9 is a table illustrating this example.

Example Connect Implementation

In one embodiment, the advanced funds processing flow described above with a Connect-application-based implementation. In this implementation, funds for cash advances are loaded into the Connect platform's balance via top-ups from an advance account, which may be dedicated to such purposes. To issue a cash advance, the payment processing system prompts users to authenticate (e.g., OAuth) the Connect application and then perform a Connect transfer to them. To pay down a cash advance, the payment processing system queries all payments from the user's connect account in the past day, computes the sum to pay down, and issues a connected account transfer from the connected account to payment processing platform. The payment processing system records the total amount paid down on each connected account transfer, ensuring that merchants are not overcharged.

FIG. 10 is a flow diagram of one embodiment of a process for paying out funds in a Connect-application-based implementation. Referring to FIG. 10, funds from an advanced funds bank account 1001 are transferred to an advanced funds Connect application 1002 using a single top-up, via ACH/wire credit. Subsequently, cash advance funds are paid out from the advanced funds Connect application 1002 to a Connect account 1003 via a connected account transfer.

FIG. 11 is a flow diagram of one embodiment of a process for performing paydowns in a Connect-application-based implementation. Referring to FIG. 11, a connected account 1101 transfers funds for the day's paydowns, via a connected account transfer, to an advanced funds Connect application 1102. Subsequently, funds representing all the connected account transfers (e.g., several merchant's paydowns) for the day are transferred from the advanced funds Connect application 1102 to the advanced funds bank account 1103 as a normal payout.

In one embodiment, in order to control the sending/receiving of transfers, a line of configuration is added with the merchant token amount and date of transfer. The Connect application checks against the configuration, and issues any transfers for advances not yet outstanding.

In one embodiment, a spreadsheet maintains the account information involved in the advanced funds and paydowns. A cron job is run periodically to ensure that cash advances in the spreadsheet have been initiated and that paydowns have been collected. Thus, in one embodiment, all of the logic for implementing cash advances and paydowns would be implemented within a cron job. In one embodiment, this job lives within a pay-server of the payment processing system, and could be deployable via Henson. In one embodiment, this job is run daily.

At a high-level, here's what would happen in each run of the job:
1. Load the spreadsheet, and check that it is well-formed.
2. Upload the spreadsheet, as a CSV, to S3 (as a snapshot for later ingestion into Presto and Redshift)
3. For each entry in the spreadsheet:
    a) If the merchant token does not correspond to a connected account, continue.
    b) Query all connected account transfers to the connected account.
    c) If no transfer exists to pay out the cash advance (as indicated by metadata on the transfers), create that transfer, then continue.
    d) Look at the most recent connected account transfer for paydowns (as indicated by metadata). Load all payments on the connected account created after the last paydown for the latest paydown transfer (also a metadata field).
    e) Compute the amount to pay down. If greater than zero, create a new connected account transfer to encompass the paydowns.

Figure 12:
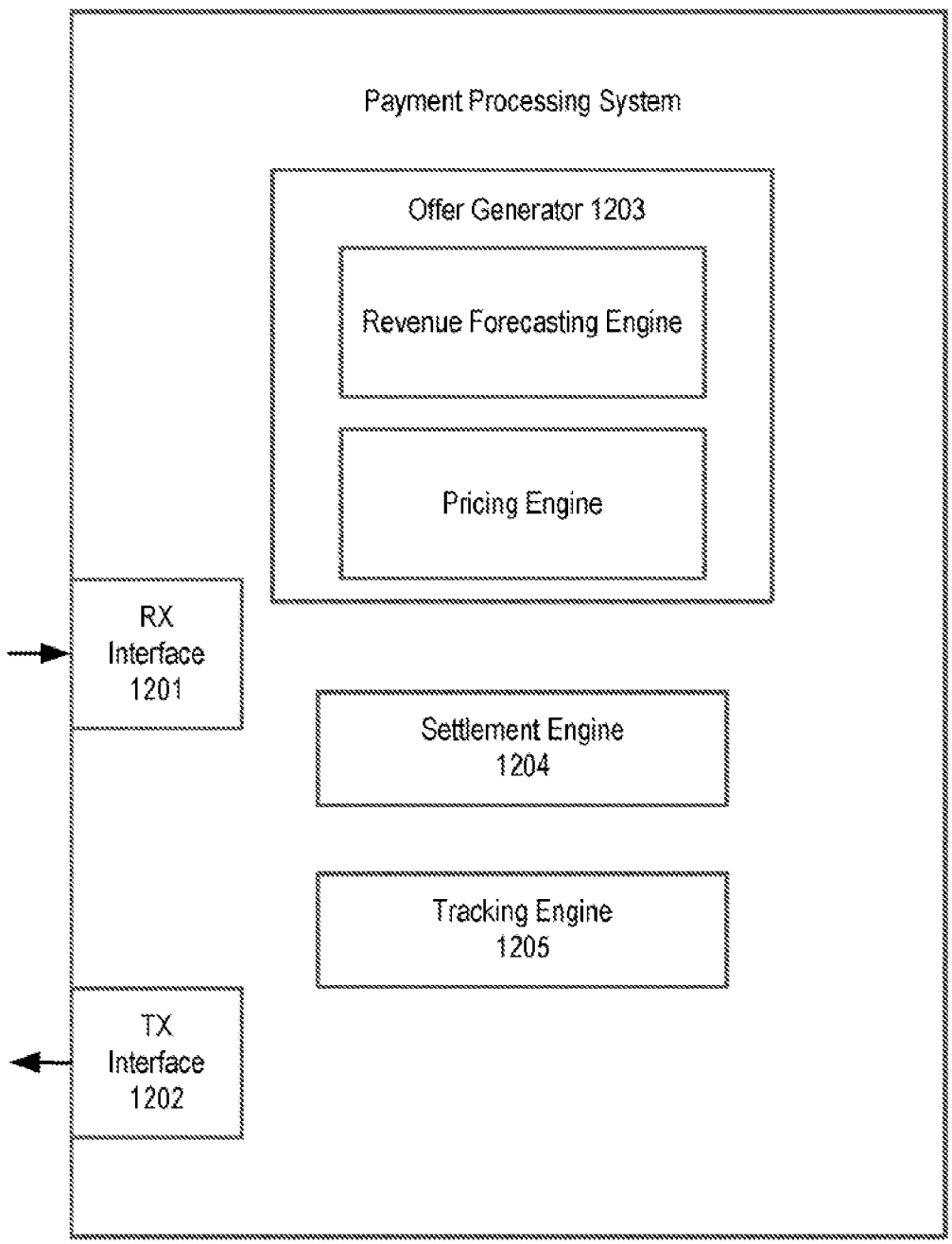
FIG. 12 is a block diagram of one embodiment of a payment processing system.

FIG. 12 is a block diagram of one embodiment of a payment processing system. The payment processing system comprises hardware (circuitry, dedicated logic, etc.), software (e.g., software running on a chip), firmware, or a combination of the three. While the payment processing system is shown as one system, in one embodiment, the payment processing system is implemented with more than one system (e.g., a plurality of processing devices, servers, computer systems, etc.).

Referring to FIG. 12, the payment processing system comprises a receive interface 1201 and a transmit communication interface 1202. Note that these may be the same interface. Receive interface 1201 and transmit interface 1202 communicate transaction information, including, but not limited to advance offer requests, acceptance/election responses and other information between the payment processing system and the merchants or other service providers.

In one embodiment, the payment processing system includes an advance funds offer generator 1203 to receive merchant information regarding revenue and generate one or more offers for individual merchants. In one embodiment, offer generator 1203 includes a revenue forecasting engine and a pricing engine that operate as described above In one embodiment, the payment processing system includes settlement engine 1204 for settling transactions including netted out transactions amounts between payment flows as described herein, including those associated with the fractions of charged funds used for paydowns of both advanced funds and the cost of the advanced funds.

In one embodiment, the payment processing system includes tracking engine 1205 for tracking transactions, including those of the advanced funds transfers, paydowns and advanced funds accounts, to enable advanced funds to be given, paydowns to be made, and balances (e.g., advanced funds balance) to be tracked. In one embodiment, tracking engine 1205 exchanges information with settlement engine 1204 to enable settlement engine 1204 to perform the netting of transaction amounts.

Note that the payment processing system includes other functional units and performs other well-known operations associated with payment processing.

Figure 13:
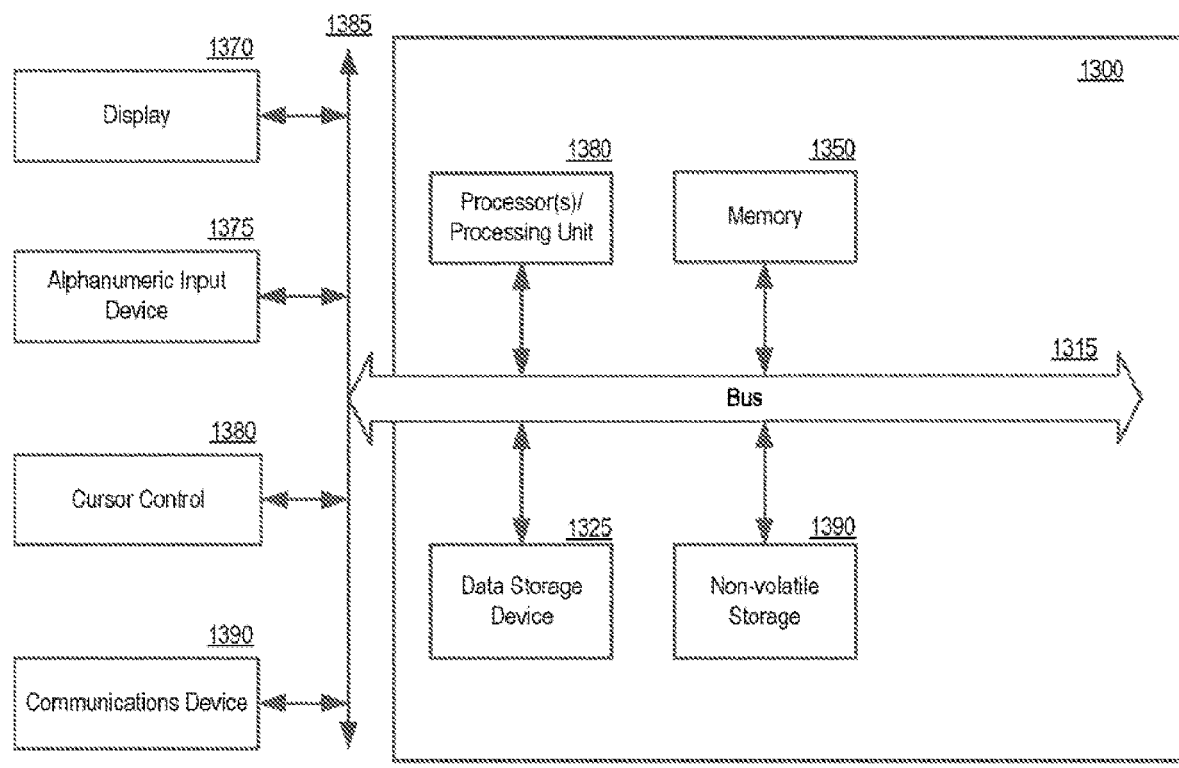
FIG. 13 is a block diagram of one embodiment of a computer system.

FIG. 13 is one embodiment of a computer system that may be used to support the systems and operations discussed herein. It will be apparent to those of ordinary skill in the art, however that other alternative systems of various system architectures may also be used.

The data processing system illustrated in FIG. 13 includes a bus or other internal communication means 1315 for communicating information, and a processor(s) 1310 coupled to the bus 1315 for processing information. The system further comprises a random-access memory (RAM) or other volatile storage device 650 (referred to as memory), coupled to bus 1315 for storing information and instructions to be executed by processor 1310. Main memory 1350 also may be used for storing temporary variables or other intermediate information during execution of instructions by processor(s) 1310. The system also comprises a read only memory (ROM) and/or static storage device 1320 coupled to bus 1315 for storing static information and instructions for processor 610, and a data storage device 1325 such as a magnetic disk or optical disk and its corresponding disk drive. Data storage device 1325 is coupled to bus 1315 for storing information and instructions.

The system may further be coupled to a display device 1370, such as a light emitting diode (LED) display or a liquid crystal display (LCD) coupled to bus 1315 through bus 1365 for displaying information to a computer user. An alphanumeric input device 1375, including alphanumeric and other keys, may also be coupled to bus 1315 through bus 1365 for communicating information and command selections to processor 1310. An additional user input device is cursor control device 1380, such as a touchpad, mouse, a trackball, stylus, or cursor direction keys coupled to bus 1315 through bus 1365 for communicating direction information and command selections to processor 1310, and for controlling cursor movement on display device 1370.

Another device, which may optionally be coupled to computer system 1300, is a communication device 1390 for accessing other nodes of a distributed system via a network. The communication device 1390 may include any of a number of commercially available networking peripheral devices such as those used for coupling to an Ethernet, token ring, Internet, or wide area network. The communication device 1390 may further be a null-modem connection, or any other mechanism that provides connectivity between the computer system 1300 and the outside world. Note that any or all of the components of this system illustrated in FIG. 13 and associated hardware may be used in various embodiments as discussed herein.

In one embodiment, processor(s) 1310 executes a revenue forecasting engine to generate a probabilistic forecast of revenue for a plurality of merchants for a period of time in the future, executes a pricing engine to determine one or more potential cash advances for each of the plurality of merchants; automatically generates one or more offers for advances for each of the plurality of merchants; electronically sends, via the network interface, a notification containing the one or more offers to the plurality of merchants for display on a graphical user interface (GUI) (e.g., a merchant dashboard used by the merchant to track payment processing performed by the payment processing system) with information about availability of an advance and terms to enable selection of at least one of the one or more offers; electronically receives, via the network interface, a response indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down; triggers a transfer of the advance to an account associated the at least one merchant; and determines when the at least one merchant processes charges for payments and creating one or more paydown objects to cause a fraction from each payment as a paydown on the advance while triggering a transfer of other funds associated with each payment to the merchant as part of settlement.

In one embodiment, processor(s) 1310 generate a plurality of revenue forecasts in parallel for each merchant of the plurality of merchants as part of executing the revenue forecasting engine. In one embodiment, processor(s) 1310 perform, as part of executing the pricing engine, a search over every possible cash advance with terms deemed acceptable for each of the plurality of merchants and calculate, as part of executing the pricing engine, a probabilistic rate of return associated with the probabilistic forecast of revenue assuming the terms. In one embodiment, processor(s) 1310 create a sweep instruction to perform a sweep to transfer the fraction representing the paydown amount, out of the card network settlement account, and into an advance account and execute a settlement engine including hardware for settling transactions associated with each of the plurality of merchants. In one embodiment, the advance account is the account from which advances are paid to one or more merchants.

It will be appreciated by those of ordinary skill in the art that any configuration of the system may be used for various purposes according to the particular implementation. The control logic or software implementing the described embodiments can be stored in main memory 1350, mass storage device 1325, or other storage medium locally or remotely accessible to processor 1310.

It will be apparent to those of ordinary skill in the art that the system, method, and process described herein can be implemented as software stored in main memory 1350 or read only memory 1320 and executed by processor 1310. This control logic or software may also be resident on an article of manufacture comprising a computer readable medium having computer readable program code embodied therein and being readable by the mass storage device 1325 and for causing the processor 1310 to operate in accordance with the methods and teachings herein.

The embodiments discussed herein may also be embodied in a handheld or portable device containing a subset of the computer hardware components described above. For example, the handheld device may be configured to contain only the bus 1385, the processor 1310, and memory 1350 and/or 1325. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 1310, a data storage device 1325, a bus 1315, and memory 1350, and only rudimentary communications mechanisms, such as a small touch-screen that permits the user to communicate in a basic manner with the device. In general, the more special-purpose the device is, the fewer of the elements need be present for the device to function.

There is a number of example embodiments described herein.

Example 1 is a method comprising: generating, using a revenue forecasting engine of a payment processing system, a probabilistic forecast of revenue for a plurality of merchants for a period of time in the future; determining, using a pricing engine of the payment processing system, one or more potential cash advances for each of the plurality of merchants; automatically generating one or more offers for advances for each of the plurality of merchants; electronically sending a notification containing the one or more offers to the plurality of merchants for display on a graphical user interface (GUI) with information about availability of an advance and terms to enable selection of at least one of the one or more offers; electronically receiving a response indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down; triggering a transfer of the advance to an account associated with the at least one merchant; and determining, by the payment processing system, when the at least one merchant processes charges for payments and creating one or more paydown objects to cause a fraction from each payment as a paydown on the advance while triggering a transfer of other funds associated with each payment to the merchant as part of settlement.

Example 2 is the method of example 1 that may optionally include filtering, based on heuristics and prior to generating the probabilistic forecast of revenue for the plurality of merchants, one or more merchants from a pool of merchants, based on heuristics, to determine the plurality of merchants to receive the one or more offers.

Example 3 is the method of example 1 that may optionally include generating, using the revenue forecasting engine, a plurality of time series revenue forecasts in parallel for the plurality of merchants.

Example 4 is the method of example 3 that may optionally include training time series models for forecasting revenue in parallel.

Example 5 is the method of example 1 that may optionally include performing, using the pricing engine, a search over every possible cash advance with terms deemed acceptable for each of the plurality of merchants.

Example 6 is the method of example 5 that may optionally include generating, using the pricing engine, a maximum advance amount for each of the plurality of merchants.

Example 7 is the method of example 5 that may optionally include that calculating, using the pricing engine, a probabilistic rate of return associated with the probabilistic forecast of revenue assuming the terms.

Example 8 is the method of example 1 that may optionally include that the notification comprises an electronic mail (email) or text message transferred over a network.

Example 9 is the method of example 1 that may optionally include that the GUI is a merchant dashboard used by the merchant to track payment processing performed by the payment processing system.

Example 10 is the method of example 1 that may optionally include automatically accepting a different advance amount lower than the advance specified in an offer with an identical rate of return, without invoking the revenue forecast engine to generate a new probabilistic forecast of revenue.

Example 11 is the method of example 1 that may optionally include automatically regenerating an offer to at least one merchant of the plurality of merchants at predetermined time intervals; and automatically expiring offers for cash advances after a predetermined period of time.

Example 12 is the method of example 1 that may optionally include determining, by the payment processing system, when the at least one merchant has satisfied an obligation to paydown the advance amount.

Example 13 is the method of example 12 that may optionally include tracking one or more balances remaining to be paid down associated with each advance; and using the one or more balances associated with the advance account for the at least one merchant to determine whether the at least one merchant has satisfied the obligation to paydown the advance.

Example 14 is the method of example 1 that may optionally include that creating one sweep instruction to perform a sweep to transfer the fraction representing the paydown amount, out of the card network settlement account, and into an advance account.

Example 15 is the method of example 14 that may optionally include that transferring advances to that at least one merchant from the advance account.

Example 16 is the method of example 14 that may optionally include periodically batching and executing in a single book transfer to transfer the cumulative paydown amount for a period of time.

Example 17 is the method of example 16 that may optionally include that the single book transfer is performed daily.

Example 18 is the method of example 1 that may optionally include that triggering the transfer of the advance to the account of the merchant is performed via Automated Clearing House (ACH).

Example 19 is the method of example 1 that may optionally include automatically sending a notification to the at least one merchant to notify the at least one merchant when becoming eligible for a cash advance.

Example 20 is the method of example 1 that may optionally include that revoking an advance to one merchant of the plurality of merchants after the offer for the advance has been accepted but hasn't been paid.

Example 21 is one or more non-transitory computer readable storage media having instructions stored thereupon which, when executed by a payment processing system having at least a processor and a memory therein, cause the payment processing system to perform operations comprising: generating, using a revenue forecasting engine of a payment processing system, a probabilistic forecast of revenue for a plurality of merchants for a period of time in the future; determining, using a pricing engine of the payment processing system, one or more potential cash advances for each of the plurality of merchants; automatically generating one or more offers for advances for each of the plurality of merchants; electronically sending a notification containing the one or more offers to the plurality of merchants for display on a graphical user interface (GUI) with information about availability of an advance and terms to enable selection of at least one of the one or more offers; electronically receiving a response indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down; triggering a transfer of the advance to an account associated with the at least one merchant; and determining, by the payment processing system, when the at least one merchant processes charges for payments and creating one or more paydown objects to cause a fraction from each payment as a paydown on the advance while triggering a transfer of other funds associated with each payment to the merchant as part of settlement.

Example 22 is the one or more media of example 21 that may optionally include that the method further comprises generating, using the revenue forecasting engine, a plurality of revenue forecasts in parallel for the plurality of merchants.

Example 23 is the one or more media of example 21 that may optionally include that the method further comprises performing, using the pricing engine, a search over every possible cash advance with terms deemed acceptable for each of the plurality of merchants.

Example 24 is the one or more media of example 23 that may optionally include that the method further comprises calculating, using the pricing engine, a probabilistic rate of return associated with the probabilistic forecast of revenue assuming the terms.

Example 25 is the one or more media of example 21 that may optionally include that the GUI is a merchant dashboard used by the merchant to track payment processing performed by the payment processing system.

Example 26 is the one or more media of example 21 that may optionally include that the method further comprises creating a sweep instruction to perform a sweep to transfer the fraction representing the paydown amount, out of the card network settlement account, and into an advance account.

Example 27 is an example of a payment processing system to process transactions of a plurality of merchants, the payment processing system comprising: a network interface; a memory to store instructions; one or more processors coupled to the memory and the network interface to execute the stored instructions to: execute a revenue forecasting engine to generate a probabilistic forecast of revenue for a plurality of merchants for a period of time in the future; execute a pricing engine to determine one or more potential cash advances for each of the plurality of merchants; automatically generate one or more offers for advances for each of the plurality of merchants; electronically send, via the network interface, a notification containing the one or more offers to the plurality of merchants for display on a graphical user interface (GUI) with information about availability of an advance and terms to enable selection of at least one of the one or more offers; electronically receive, via the network interface, a response indicating selection by at least one merchant of one of the one or more offers from activation of a GUI element associated with the selected offer, indicating an election to receive a cash advance, while agreeing to a deduction in funds from future payments until the advance and an additional cost associated with the cash advance have been paid down; trigger a transfer of the advance to an account associated with the at least one merchant; and determine when the at least one merchant processes charges for payments and creating one or more paydown objects to cause a fraction from each payment as a paydown on the advance while triggering a transfer of other funds associated with each payment to the merchant as part of settlement.

Example 28 is the system of example 27 that may optionally include that the one or more processors are operable to generate a plurality of time series revenue forecasts in parallel for the plurality of merchants as part of executing the revenue forecasting engine.

Example 29 is the system of example 27 that may optionally include that the one or more processors are operable to perform, as part of executing the pricing engine, a search over every possible cash advance with terms deemed acceptable for each of the plurality of merchants.

Example 30 is the system of example 29 that may optionally include that the one or more processors are operable to calculate, as part of executing the pricing engine, a probabilistic rate of return associated with the probabilistic forecast of revenue assuming the terms.

Example 31 is the system of example 27 that may optionally include that the GUI is a merchant dashboard used by the merchant to track payment processing performed by the payment processing system.

Example 32 is the system of example 27 that may optionally include that the one or more processors are operable to create a sweep instruction to perform a sweep to transfer the fraction representing the paydown amount, out of the card network settlement account, and into an advance account.

Example 33 is the system of example 27 that may optionally include that the one or more processors execute a settlement engine including hardware for settling transactions associated with each of the plurality of merchants.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:
1. A method for reducing computing processing time for generating forecasts, the method comprising:
 filtering, using a processing system of a gateway server system, a pool of merchants to obtain a plurality of merchants to whom an offer of an advance may be made;

generating, using the processing system of the gateway server system and for the plurality of merchants, a set of time series forecasts in parallel by using a distributed cluster-computing framework that schedules execution of a forecasting function in parallel on parallel virtual machines;

generating, on the gateway server system using a pricing engine executed by the processing system and based on the set of time series forecasts, an electronic communication comprising an offer of a cash advance, the offer comprising an amount and terms, wherein the offer is based on:
  a probabilistic revenue forecast for a period of time; and
  a rate of return;

transmitting, by the gateway server system and to a merchant of the plurality of merchants, the electronic communication comprising the offer;

receiving, by the gateway server system from the merchant in response to the offer, a response electronic communication;

in response to an acceptance of the offer by the merchant within the response electronic communication, transferring the amount associated with the cash advance to an account associated with the merchant; and in response to detecting, by the processing system of the gateway server system, a payment to the merchant:
  applying a paydown amount associated with the cash advance against a balance of the cash advance; and
  transferring a remainder of the payment to the account associated with the merchant.

2. The method of claim 1, wherein a status of the offer is maintained in a state machine,
  the state machine executable by the processing system of the gateway server system and configured to transition states based on one or more events detected by the processing system of the gateway server system.

3. The method of claim 1, wherein applying the paydown amount and transferring the remainder comprises:
  determining, by the processing system of the gateway server system, when the merchant processes charges for payments;
  creating one or more paydown objects to cause a fraction from each payment as a paydown on the advance, wherein each of the one or more paydown objects is generated with a balance transaction for the merchant to track settlement of funds each time a merchant processes a charge and invokes use of the gateway server system;
  creating, by the processing system of the gateway server system, a sweep instruction to perform a sweep to transfer the fraction representing the paydown amount, out of a card network settlement account associated with the merchant, and into an advance account; and
  executing, by the processing system of the gateway server system, the sweep instruction to perform the sweep to transfer the fraction representing the paydown amount, out of the card network settlement account, and into the advance account.

4. The method of claim 3, further comprising:
periodically batching and executing a single transfer to transfer a cumulative paydown amount of a set of fractional paydown amounts for a period of time.

5. The method of claim 3, further comprising transferring an advance to the merchant from the advance account.

6. The method of claim 1, wherein the filtering is based on filtering conditions comprising at least one of:

a predetermined level of revenue of the merchant;
a predetermined diversity of product categories of the merchant;
a predetermined increase of sales over time of the merchant;
a predetermined amount of time, by the merchant, with the gateway server system; or
a set of predetermined locations.

7. The method of claim 1, wherein the pricing engine produces a maximum advance amount for the merchant based on a size and a term of one or more potential cash advances.

8. The method of claim 1, further comprising:
calculating, using the pricing engine, a probabilistic rate of return associated with the probabilistic revenue forecast associated with the terms.

9. The method of claim 1, further comprising:
tracking one or more balances associated with the advance; and
using the one or more balances associated with the advance for the merchant to determine whether the merchant has satisfied an obligation to repay the advance.

10. The method of claim 1, wherein transferring the amount associated with the cash advance to the account associated with the merchant is performed via Automated Clearing House (ACH).

11. The method of claim 1, further comprising sending a notification to the merchant upon becoming eligible for a cash advance.

12. The method of claim 1, further comprising revoking an advance to the merchant, after the offer for the advance has been accepted, and before the amount associated with the cash advance has not been transferred.

13. A gateway server system to process transactions of a plurality of merchants, the gateway server system comprising:
  memory; and
  one or more processors, coupled to the memory, configured to cause the gateway server system to:
    filter a pool of merchants to obtain a plurality of merchants to whom an offer of an advance may be made;
    generate for the plurality of merchants, a set of time series forecasts in parallel by using a distributed cluster-computing framework that schedules execution of a forecasting function in parallel on parallel virtual machines;
    generate, based on the set of time series forecasts, an electronic communication comprising an offer of a cash advance, the offer comprising an amount and terms, wherein the offer is based on:
      a probabilistic revenue forecast for a period of time; and
      a rate of return;
    transmit to a merchant of the plurality of merchants, the electronic communication comprising the offer;
    receive, from the merchant in response to the offer, a response electronic communication;
    in response to an acceptance of the offer by the merchant within the response electronic communication, transfer the amount associated with the cash advance to an account associated with the merchant; and
    in response to detecting a payment to the merchant:
      apply a paydown amount associated with the cash advance against a balance of the cash advance; and transfer a remainder of the payment to the account associated with the merchant.

14. The gateway server system of claim 13, wherein a status of a generated offer is maintained in a state machine, the state machine executable by the one or more processors of the gateway server system and configured to transition states based on one or more events detected by the gateway server system.

15. The gateway server system of claim 13, wherein to apply the paydown amount and transfer the remainder, the one or more processors are configured to cause the gateway server system to:
- determine when the merchant processes charges for payments;
- create one or more paydown objects to cause a fraction from each payment as a paydown on the advance, wherein each of the one or more paydown objects is generated with a balance transaction for the merchant to track settlement of funds each time a merchant processes a charge and invokes use of the gateway server system;
- create a sweep instruction to perform a sweep to transfer the fraction representing the paydown amount, out of a card network settlement account associated with the merchant, and into an advance account; and
- execute the sweep instruction to perform the sweep to transfer the fraction representing the paydown amount, out of the card network settlement account, and into the advance account.

16. One or more non-transitory computer readable storage media having instructions stored thereupon which, when executed by a processing system of a gateway server system, cause the gateway server system to:
- filter a pool of merchants to obtain plurality of merchants to whom an offer of an advance may be made;
- generate, for the plurality of merchants, a set of time series forecasts in parallel by using a distributed cluster-computing framework that schedules execution of a forecasting function in parallel on parallel virtual machines;
- generate, based on the set of time series forecasts, an electronic communication comprising an offer of a cash advance, the offer comprising an amount and terms, wherein the offer is based on:
  - a probabilistic revenue forecast for a period of time; and
  - a rate of return;
- transmit to a merchant of the plurality of merchants, the electronic communication comprising the offer;
- receive a response electronic communication;
- in response to an acceptance of the offer by the merchant within the response electronic communication, transfer the amount associated with the cash advance to an account associated with the merchant; and
- in response to detecting, by the processing system of the gateway server system, a payment to the merchant:
  - apply a paydown amount associated with the cash advance against a balance of the cash advance; and
  - transfer a remainder of the payment to the account associated with the merchant.

17. The one or more non-transitory computer readable storage media of claim 16, wherein a status of the offer is maintained in a state machine.

18. The one or more non-transitory computer readable storage media of claim 16, wherein the instructions further cause the gateway server system to:
- periodically batch and execute a single transfer to transfer a cumulative paydown amount of a set of fractional paydown amounts for a period of time.

19. The one or more non-transitory computer readable storage media of claim 16, wherein the filtering is based on filtering conditions comprising a predetermined amount of time, by the merchant, with the gateway server system.

20. The one or more non-transitory computer readable storage media of claim 16, wherein the filtering is based on filtering conditions comprising a set of predetermined locations.

* * * * *